United States Patent
Lang et al.

(10) Patent No.: US 8,215,415 B2
(45) Date of Patent: Jul. 10, 2012

(54) CHISEL

(75) Inventors: Marco Lang, Ravensburg (DE); Franc Koljaka, Bergamo (IT); Friedmar Dresig, Chemnitz (DE); Thomas Bernhardt, Aichtal (DE)

(73) Assignees: Hawera Probst GmbH, Ravensburg (DE); Aresi S.P.A., Bergamo (IT)

( * ) Notice: Subject to any disclaimer, the term of this patent is extended or adjusted under 35 U.S.C. 154(b) by 1122 days.

(21) Appl. No.: 10/189,798

(22) Filed: Jul. 8, 2002

(65) Prior Publication Data

US 2003/0026669 A1 Feb. 6, 2003

(30) Foreign Application Priority Data

Jul. 6, 2001 (DE) .................................. 101 32 292
Feb. 28, 2002 (DE) .................................. 102 08 628

(51) Int. Cl.
*B25D 15/00* (2006.01)
*B28D 1/26* (2006.01)

(52) U.S. Cl. ............. 173/93; 173/210; 125/40; 408/226

(58) Field of Classification Search .................... 173/93, 173/114, 200, 202, 171, 210; 299/94, 69, 299/100, 96; 125/40–43; 408/226, 143
See application file for complete search history.

(56) References Cited

U.S. PATENT DOCUMENTS

| 1,162,889 | A | * | 12/1915 | Thiele | 173/48 |
|---|---|---|---|---|---|
| 1,209,362 | A | * | 12/1916 | Turner | 408/226 |
| 2,209,079 | A | * | 7/1940 | Gilman | 175/412 |
| 2,360,385 | A | * | 10/1944 | Anderson | 408/59 |
| 2,367,458 | A | * | 1/1945 | Coplen | 403/348 |
| 2,682,184 | A | * | 6/1954 | Szarkowski | 408/226 |
| 2,889,811 | A | * | 6/1959 | Guillemier | 173/210 |
| 3,136,347 | A | * | 6/1964 | Linquist | 408/226 |
| 3,336,081 | A | * | 8/1967 | Ericsson | 299/113 |
| 3,645,642 | A |  | 2/1972 | Koslow |  |
| 3,842,942 | A | * | 10/1974 | Jensen et al. | 181/207 |
| 3,848,931 | A | * | 11/1974 | Swisher | 299/100 |
| 3,856,107 | A | * | 12/1974 | Rabett | 181/207 |
| 3,918,530 | A | * | 11/1975 | Nyholm | 173/1 |
| 4,109,734 | A | * | 8/1978 | Montabert | 173/114 |
| 4,168,754 | A | * | 9/1979 | Nyholm | 175/325.2 |
| 4,993,894 | A | * | 2/1991 | Fischer et al. | 408/14 |
| 5,145,237 | A | * | 9/1992 | Schulz et al. | 299/100 |
| 5,466,100 | A | * | 11/1995 | Ahluwalia | 408/224 |
| 5,788,431 | A | * | 8/1998 | Basteck | 408/229 |
| 5,971,673 | A | * | 10/1999 | Berglund et al. | 408/1 R |
| 5,984,596 | A | * | 11/1999 | Fehrle et al. | 408/226 |
| 5,988,953 | A | * | 11/1999 | Berglund et al. | 408/1 R |

(Continued)

FOREIGN PATENT DOCUMENTS

DE 25 42 001 3/1977

(Continued)

*Primary Examiner* — Paul R Durand
(74) *Attorney, Agent, or Firm* — Venable LLP; Robert Kinberg; Lars H. Genieser

(57) ABSTRACT

A tool bit for a chisel or a hammer drill, in particular, a insertable chisel or insertable drill for power-driven drill and chisel hammers, has an insertion end, with a chisel shank or drill shank, and a chisel head or drill shank located opposite the insertion end. The diameter of the shank increases in the direction of the chisel head at least once from a first, small diameter to a second, large diameter and decreases again from this to a small diameter or forms at least one bead.

11 Claims, 10 Drawing Sheets

U.S. PATENT DOCUMENTS 6,000,888 A * 12/1999 Hartman ................... 408/239 R

FOREIGN PATENT DOCUMENTS

| DE | 4024650 A1 | 2/1992 |
| --- | --- | --- |
| DE | 9209647.6 U1 | 10/1992 |
| DE | 4322588 A1 | 1/1995 |
| DE | 196 10 478 | 9/1997 |
| DE | 19901752 A1 | 7/2000 |
| DE | 19914522 A1 | 10/2000 |
| EP | 0 278 288 | 8/1988 |
| GB | 346217 | 4/1931 |
| GB | 1357984 | 6/1974 |
| GB | 2212091 A | 7/1989 |

* cited by examiner

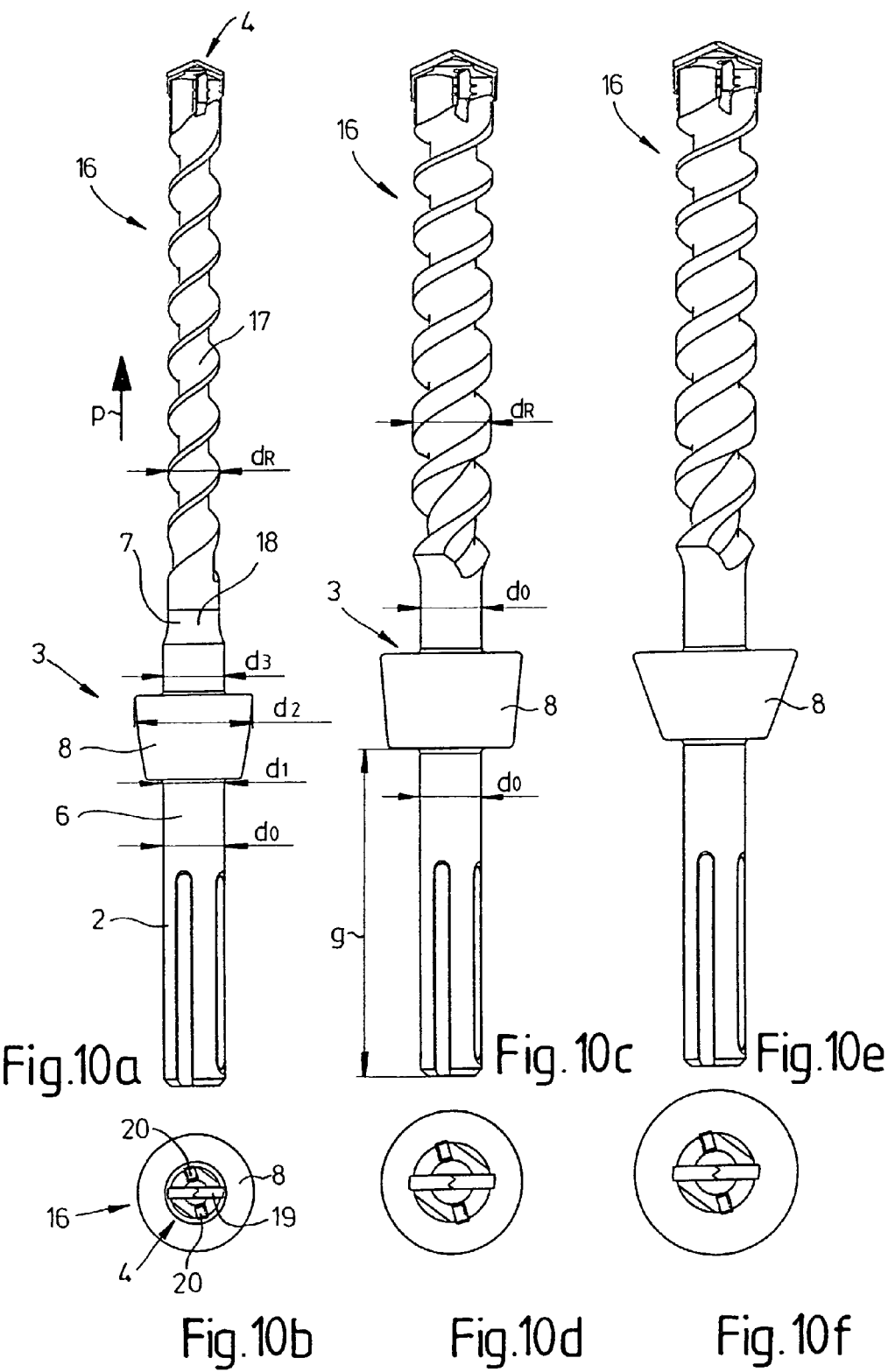

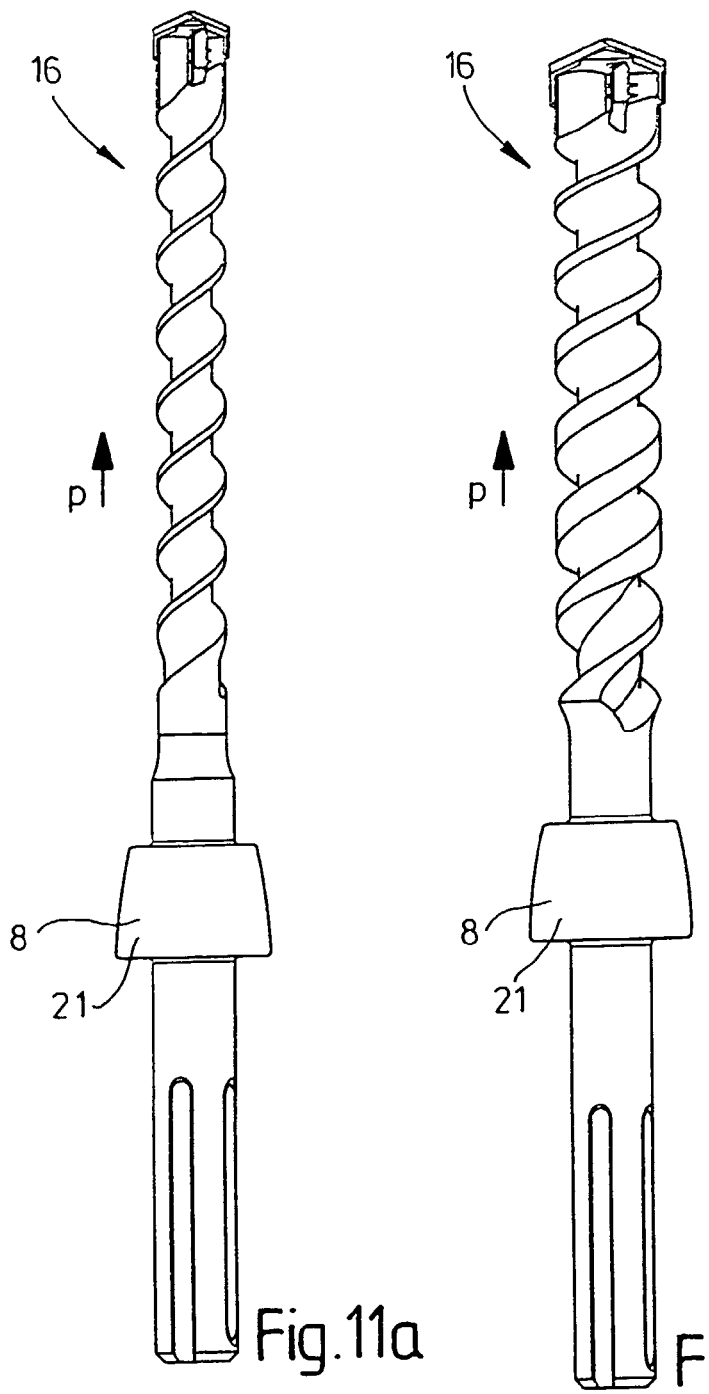
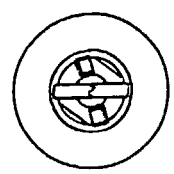
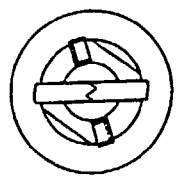

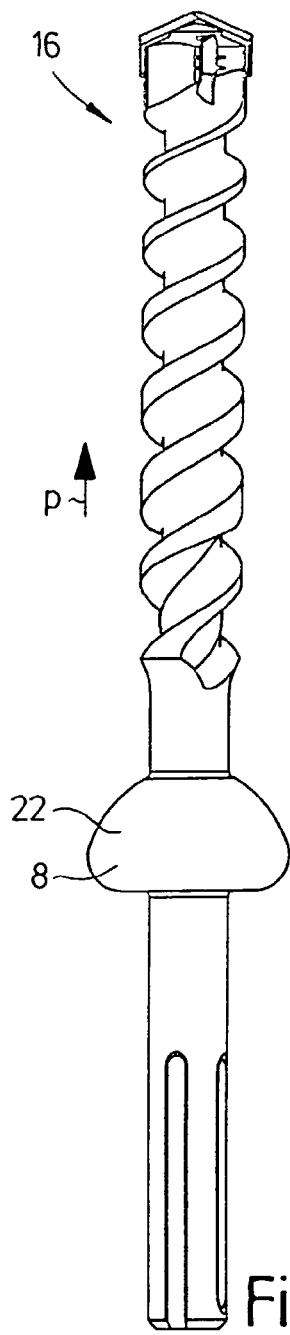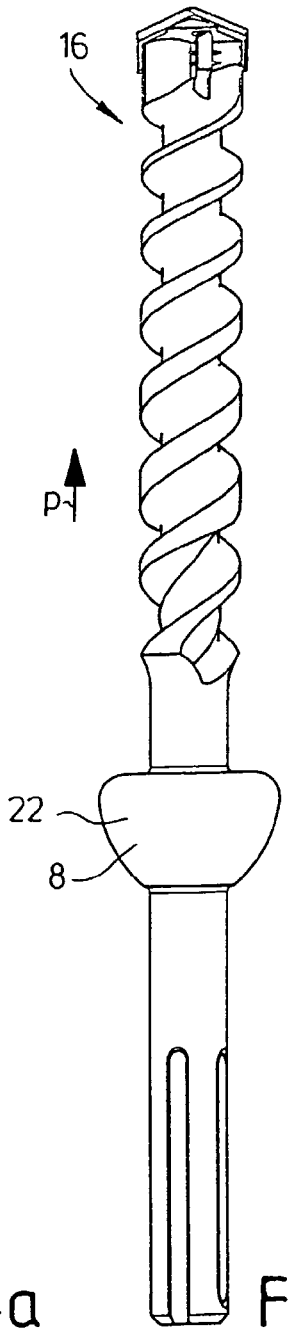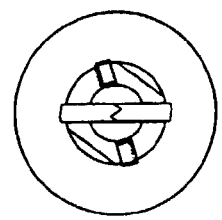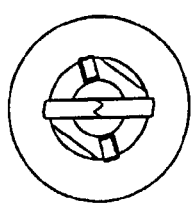

CHISEL

CROSS REFERENCE TO RELATED APPLICATIONS

This application claims the priority of German Patent Application No. 101 32 292.5 filed Jul. 6, 2001 and German Patent Application No. 102 08 628.1 filed on Feb. 28, 2002, the disclosures of which are incorporated herein by reference.

BACKGROUND OF THE INVENTION

This invention relates to an insertable hammer drill, or an insertable chisel, for power-driven drill or chisel hammers. The drill, or chisel, has an insertion end, a shank attached to the insertion end, and a drill or chisel head attached to the shank and located opposite the insertion end In addition, for example, to the configuration of the cutting edge and to the material used, the shape of the shank of a chisel is also critical for the effectiveness of the latter. DE 40 24 650 A1 discloses, for example, a chisel in which the diameter of the chisel shank narrows in steps from the insertion end toward the chisel tip, and, in this case, a contraction may also be provided. Furthermore, DE-UM 92 09 647 discloses a chisel which is produced as a forged part and the shank of which narrows conically toward the working end and may likewise have a contraction. DE 199 14 522 A1 discloses a chisel with a hexagonal insertion end which has a collar between the insertion end and the shank. This collar has purely the function and action of an abutment. The disadvantage of the two known chisels mentioned first is that the diameter of the shank narrows toward the chisel cutting edge and the stability of the chisel shank decreases continuously or in steps toward the working end. A shaping of this kind is critical, in particular, in the case of chisels with a medium and smaller initial diameter of the chisel shank and in the case of chisels with long chisel shanks, since, as a result of the narrowing, a chisel shank diameter is quickly reached which, because of the minimum mechanical requirements to be met by the chisel shank, is within a critical range and counteracts unintended vibrations to only a slight extent. These considerations also apply similarly to hammer drills as regards their hammering or chiseling property. In the field of drills, what may be referred to as collar drills are known (see, for example, DE 43 22 588 A1, FIG. 3), which have a thickening in the shank region or spiral region. This thickening is co-ordinated in its position with the drilling depth provided. The size and shape of this thickening are aimed at taking as great a care as possible of the workpiece to be machined when the desired drilling depth is reached.

SUMMARY OF THE INVENTION

The object on which the invention is based is to develop a chisel or hammer drill of the type initially described, the shank of which has a shape which has a beneficial action on the effectiveness and the vibrational behavior of the chisel or hammer drill, but does not lead to a mechanically critical narrowing of the diameter of the shank.

This object is achieved, according to the invention, by having a drill or chisel shank wherein the diameter of the shank increases in the direction of the head at least once from a first small diameter, or a first small cross sectional area, to a large diameter, or a large cross sectional area, and then decreases again to a second small diameter or a second small cross-sectional area.

The chisel or hammer drill according to the invention has a shank with at least one thickening or upset which is formed by an increase in the cross-sectional area of the shank and a subsequent decrease in the cross-sectional area of the shank in the direction of a longitudinal axis. By the shape of the shank being changed in regions in this way, a concentration of the percussion or impact energy, which is introduced into the chisel or hammer drill by the power-driven drill or chisel hammer, is brought about and a damping of vibrations is achieved. That region of the beadlike thickening which narrows toward the working end exerts virtually a comparable action to the chisels which narrow continuously or in portions, this action being achieved in the chisel or hammer drill according to the invention, without a reduction in the initial cross-sectional area or in the initial diameter of the shank taking place. By thickenings according to the invention being lined up directly and/or distributed regularly and/or irregularly over the length of the shank, it is possible to utilize, and consequently accumulate, the positive influence of narrowings over the entire length of the shank.

An advantageous design of the subject of the invention provides for making the first, small diameter or the first, small cross-sectional area approximately identical to the third, small diameter or the third, small cross-sectional area. This ensures that a minimum diameter of the shank is maintained.

Furthermore, the invention provides for making the third, small diameter or the third, small cross-sectional area of a first bead approximately just as large as the first, small diameter or the first, small cross-sectional area of a second bead. By virtue of dimensional ratios of this kind, a transitional region between two beads acquires a shape of constant cross section.

The chisel or the hammer drill acquires advantageous properties, in particular, when the first and the third, small diameters have a ratio of about 1:1.6 to the second, large diameter. It is also advantageous if the third and the first, small diameters have a ratio of about 1:1.2 to the second, large diameter.

By the use of the circular and/or oval and/or elliptic and/or polygonal cross section of the shank, the latter can be optimized particularly in terms of the working end. For example, in the case of a wide flat chisel, it is advantageous to use an elliptic cross section of the shank, in which a large semiaxis of the ellipse has the same orientation as the chisel cutting edge.

It is particularly advantageous if the increase in diameter or increase in cross section and the decrease in diameter or decrease in cross section of the shank takes place over length portions of approximately equal length. Increases and decreases which are in a ratio of about 1:10 or 10:1 are also considered advantageous. Beads which are designed within these limits have a damping of the vibrations and a quicker chiseling or drilling/chiseling advance than conventional chisels or hammer drills.

The invention provides, furthermore, for arranging at least two beads in an identical orientation one behind the other. This gives rise to a kind of series connection, in which the positive properties of the individual beads supplement one another.

Finally, there is provision for arranging beads mirror-symmetrically to a plane perpendicularly intersecting the longitudinal axis of the shank and, in particular, for causing said beads to merge directly one into the other. The positive influences of the beads likewise interact as a result.

Moreover, the invention provides for placing the position of the bead on the hammer drill or on the chisel as a function of the length of a beater working in the power-driven drill hammer or in the chisel hammer. It is thereby possible to design the hammer drill and chisel for a special power-driven drill hammer or chisel hammer or to optimize them for an entire construction series of power-driven drill hammers or chisel hammers. It is optimum if the bead is at a distance from the rear end of the hammer drill or chisel which corresponds approximately to 2 to 4 times the length of the beater. There is also provision for adapting the hammer drill or the chisel to the power-driven drill hammer or chisel hammer in terms of the weight of the bead which likewise decisively co-determines its mode of action. An optimum action of the bead can thereby be achieved. This optimum action is afforded when the mass of said bead is co-ordinated with the weight of the beater in the power-driven drill hammer or chisel hammer and is approximately 0.2 to 0.7 times the beater mass.

BRIEF DESCRIPTION OF THE DRAWINGS

Further details of the invention are described, with reference to diagrammatically illustrated exemplary embodiments, in the drawing in which:

FIGS. 11a to 11d show side views and top views of two hammer drills with beads narrowing in the effective direction,
FIGS. 14a to 14d show side views and top views of two hammer drills with beads approximately in the form of a mushroom head.

DETAILED DESCRIPTION OF PREFERRED EMBODIMENTS

Figure 1:
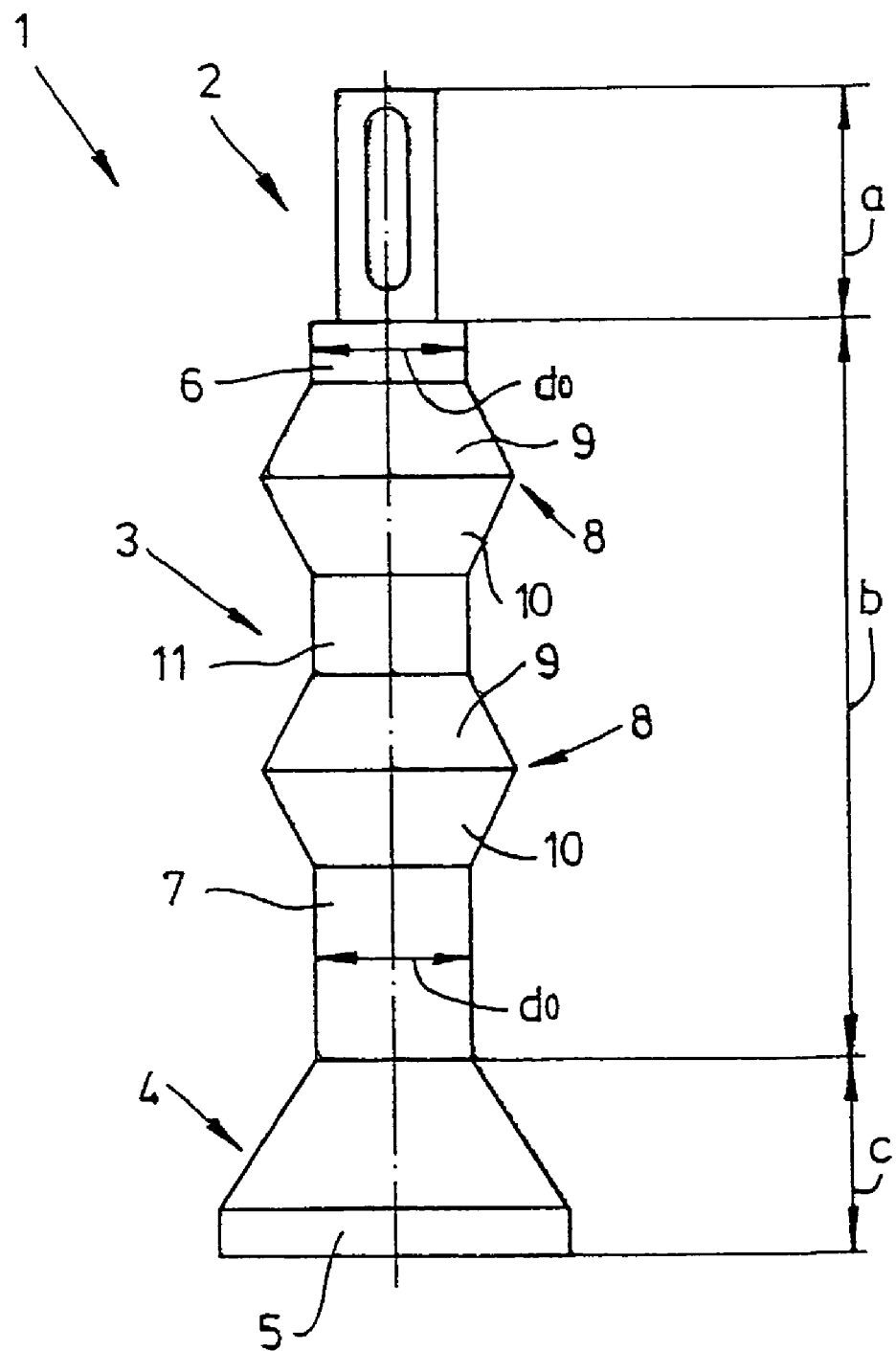
FIG. 1 shows a side view of a chisel.

FIG. 1 illustrates a side view of a chisel 1. The chisel 1 is composed of an insertion end 2, of a chisel shank 3 and of a working end 4 with a cutting edge 5. The insertion end 2 extends over an insertion region a, the chisel shank 3 extends over a shank region b and the working end 4 extends over a working region c. The chisel shank 3 has toward the insertion end 2 and toward the working end 4 an initial diameter $d_0$. Two beads or thickenings or upsets 8 are formed on the chisel shank 3 between an upper chisel shank portion 6 and a lower chisel shank portion 7. The thickenings 8 are composed in each case of two cone frustums 9, 10 of circular cross section. Between the thickenings 8, the chisel shank 3 has a middle chisel shank portion 11 which corresponds in cross section to the upper and the lower chisel shank portion 6, 7.

Figure 2:
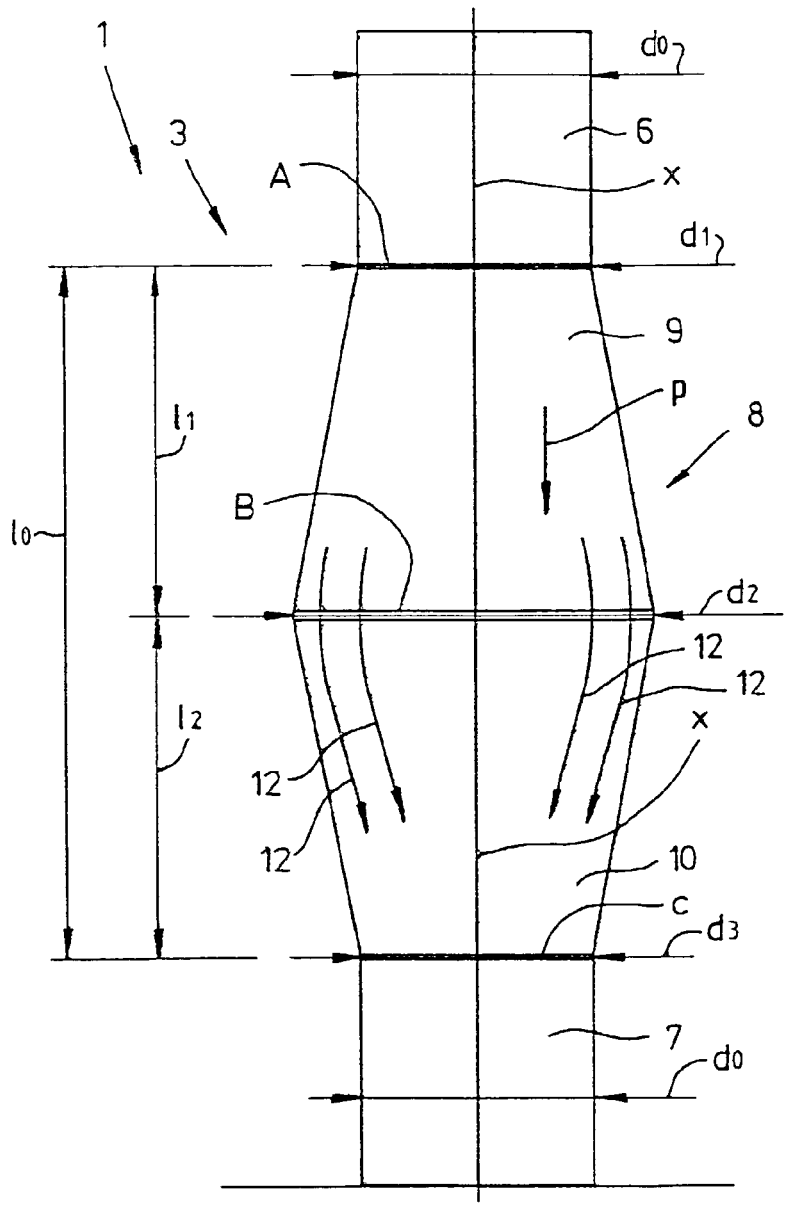
FIG. 2 shows a side view of a chisel shank.

FIG. 2 shows a chisel shank 3 of a chisel 1, the illustration of an insertion end and of a working end having been dispensed with for the sake of simplification. The chisel shank 3, like the chisel shank illustrated in FIG. 1, has a thickening 8 which is formed by two cone frustums 9, 10. Above the thickening 8, the chisel shank 3 merges into an upper chisel shank portion 6. Below the thickening 8, the chisel shank 3 merges into a lower chisel shank portion 7. The chisel shank portions 6, 7 have identical initial diameters $d_0$. The thickening 8 grows in the percussion direction p from a first, small diameter $d_1$, which corresponds to the initial diameter $d_0$, to a second, large diameter $d_2$ and subsequently decreases, in the region of the cone frustum 10, to a third, small diameter $d_3$, which again corresponds to the initial diameter $d_0$. In the region of the cone frustum 10, percussion waves 12 acting on the chisel 1 or the chisel shank 3 from a power-driven drill or chisel hammer, not illustrated, are concentrated toward a longitudinal mid-axis x of the chisel 1 and thus ensure an effective transmission of the energy introduced. The thickening 8 extends over a length $l_0$, the cone frustums 9, 10 extending over the lengths $l_1$ and $l_2$. The lengths $l_1$ and $l_2$ are approximately identical.

Figure 3:
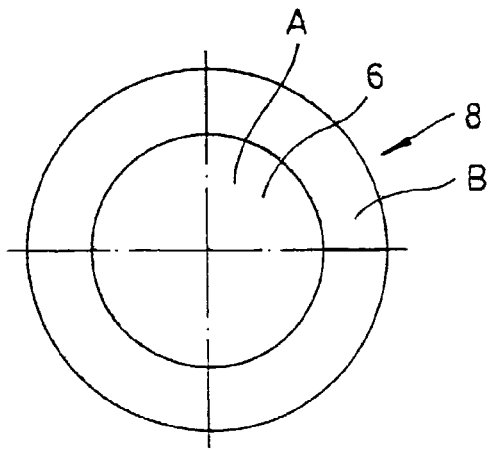
FIG. 3 shows a top view of the chisel shank illustrated in FIG. 2.

FIG. 3 shows a top view of the chisel shank illustrated in FIG. 2. The upper chisel shank portion 6 and the thickening 8 have circular cross sections A, B. According to the change in diameter, the cross section A of the chisel shank portion 6 increases over the length $l_1$ to the maximum cross section B of the thickening 8 and then decreases again to a cross section C (see FIG. 2) of the lower chisel shank portion 7.

Figure 4:
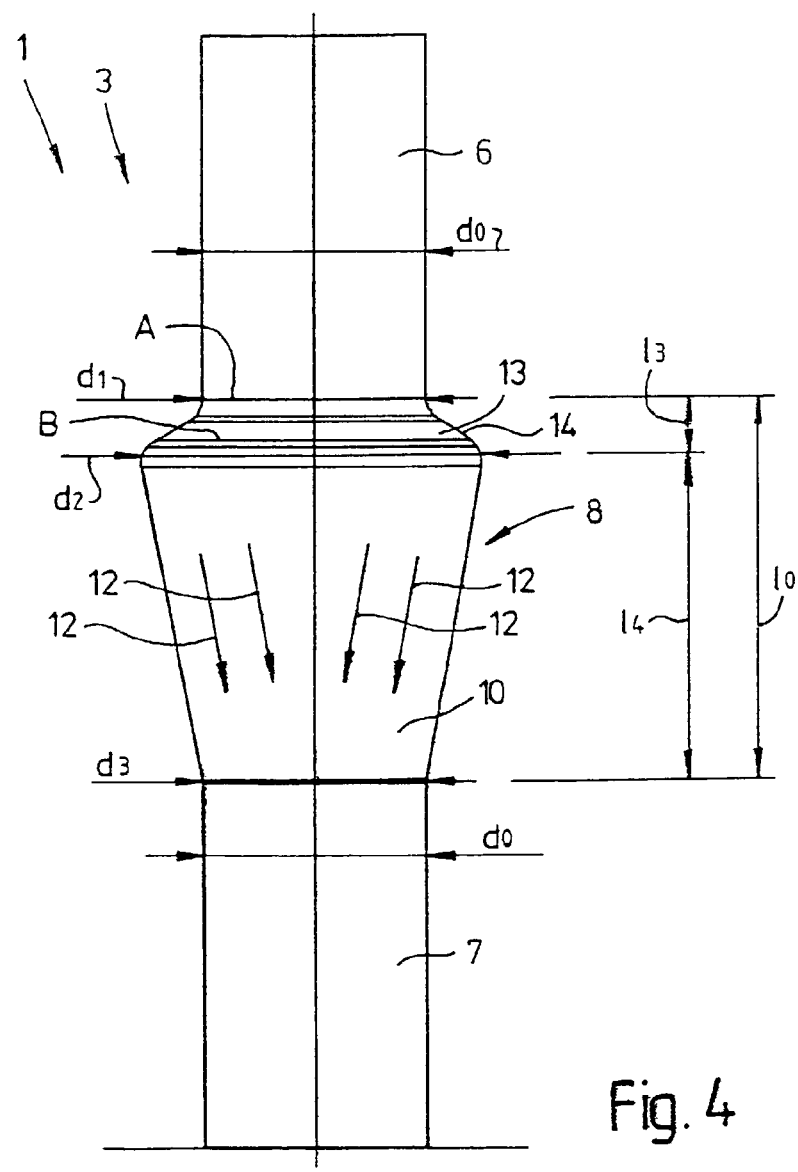
FIG. 4 shows a side view of a further chisel shank.

FIG. 4 shows a further chisel 1, of which only a chisel shank 3 is illustrated for the sake of simplification. Between an upper chisel shank portion 6 and a lower chisel shank portion 7 is arranged a thickening 8 which is composed of a cone frustum 10 and of a body of revolution 13. The body of revolution 13 has a curved generatrix 14 which runs in an approximately S-shaped manner. In the region of the thickening 8, the diameter of the chisel shank 3 rises from a first, small diameter $d_1$ to a second, large diameter $d_2$ and then falls again back to a third, small diameter $d_3$. In this case, the diameters $d_1$, $d_3$ correspond to diameters $d_0$ of the chisel shanks 6, 7. The increase in diameter and the decrease in diameter of the thickening 8 take place over length portions $l_3$ and $l_4$ which are in a ratio of about 1:5. That is to say, the increase in diameter takes place more quickly than the decrease in diameter. A slow concentration of percussion waves 12 onto the lower chisel shank portion 7, which merges into a working end, not illustrated, is thereby possible.

Figure 5:
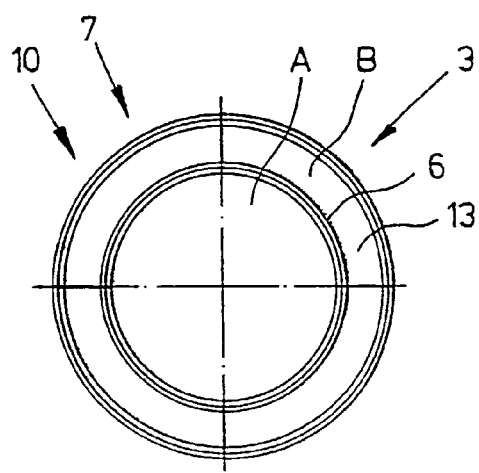
FIG. 5 shows a top view of the chisel shank illustrated in FIG. 4.

FIG. 5 shows a top view of the chisel shank 3 illustrated in FIG. 4. The upper chisel shank portion 6 and the body of revolution 13 have circular cross sections A, B. This also applies to the cone frustum 10 and to the lower chisel shank portion 7.

Figure 6:
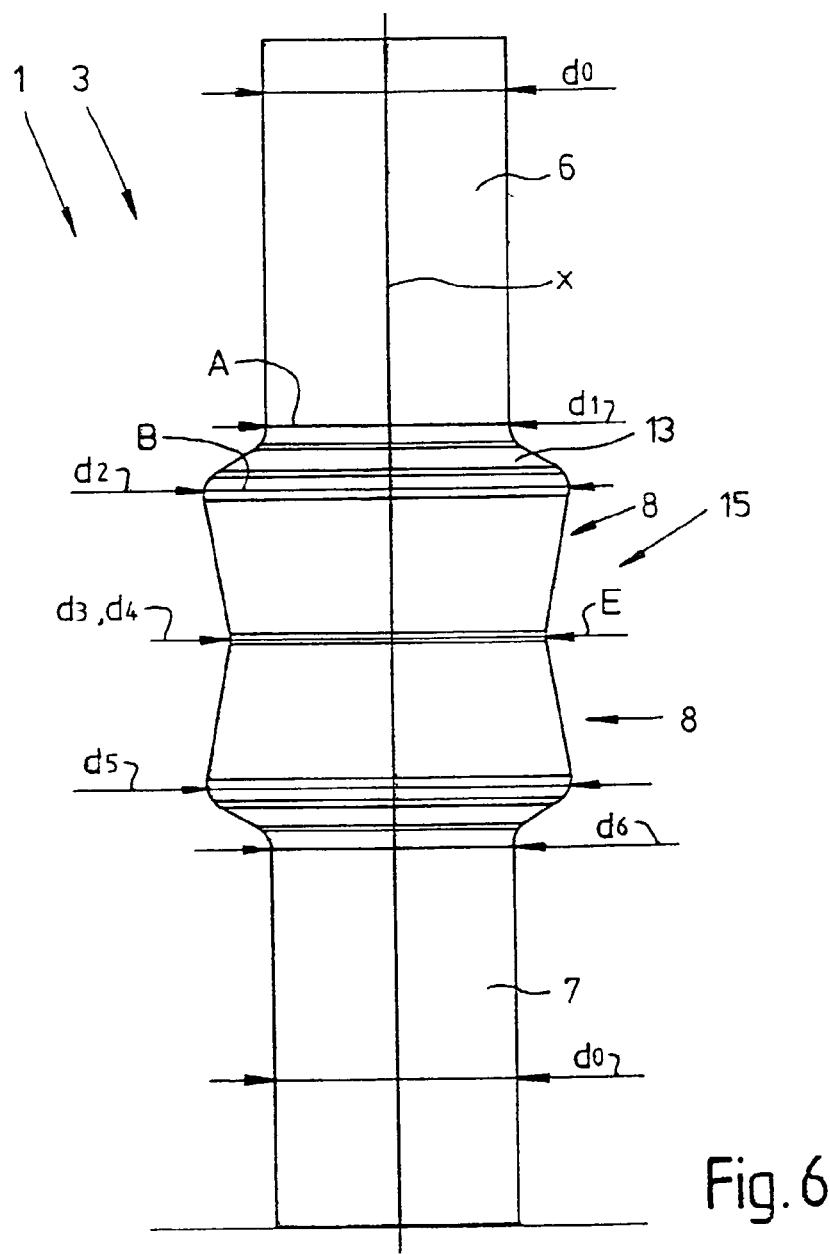
FIG. 6 shows a side view of a third chisel shank.

FIG. 6 shows a further chisel 1, of which only a chisel shank 3 is illustrated for the sake of simplification. The chisel shank 3 has, between an upper chisel shank portion 6 and a lower chisel shank portion 7, two thickenings 8 which butt directly onto one another or merge directly one into the other. The two thickenings 8 are formed mirror-symmetrically to a mirror plane E, through which a chisel longitudinal axis x runs perpendicularly. The upper thickening 8 increases from a diameter $d_1$ to a diameter $d_2$ and then decreases again to a diameter $d_3$. The diameter $d_3$ of the upper thickening 8 corresponds to the first, small diameter $d_4$ of the lower thickening 8 which increases from the diameter $d_4$ to a diameter $d_5$ and then decreases again to a diameter $d_6$. The initial diameter $d_1$ and the final diameter $d_6$ of a double bead 15 formed by the two thickenings 8 corresponds to initial diameters $d_0$ of the chisel shank portions 6, 7. The double bead 15 possesses, in particular, also vibration-damping properties which assist in avoiding unintended vibrations of the chisel 1.

Figure 7:
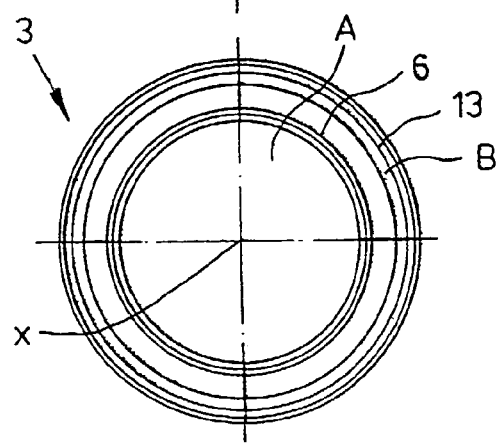
FIG. 7 shows a top view of the chisel shank illustrated in FIG. 6.

FIG. 7 shows a top view of the chisel shank 3 illustrated in FIG. 6. The upper chisel shank portion 6 and a body of revolution 13 of the upper thickening 8 have circular cross sections A, B. The chisel shank 3 is of rotationally symmetric design in its entire region and therefore has circular cross sections perpendicularly to the longitudinal mid-axis x.

Figure 8:
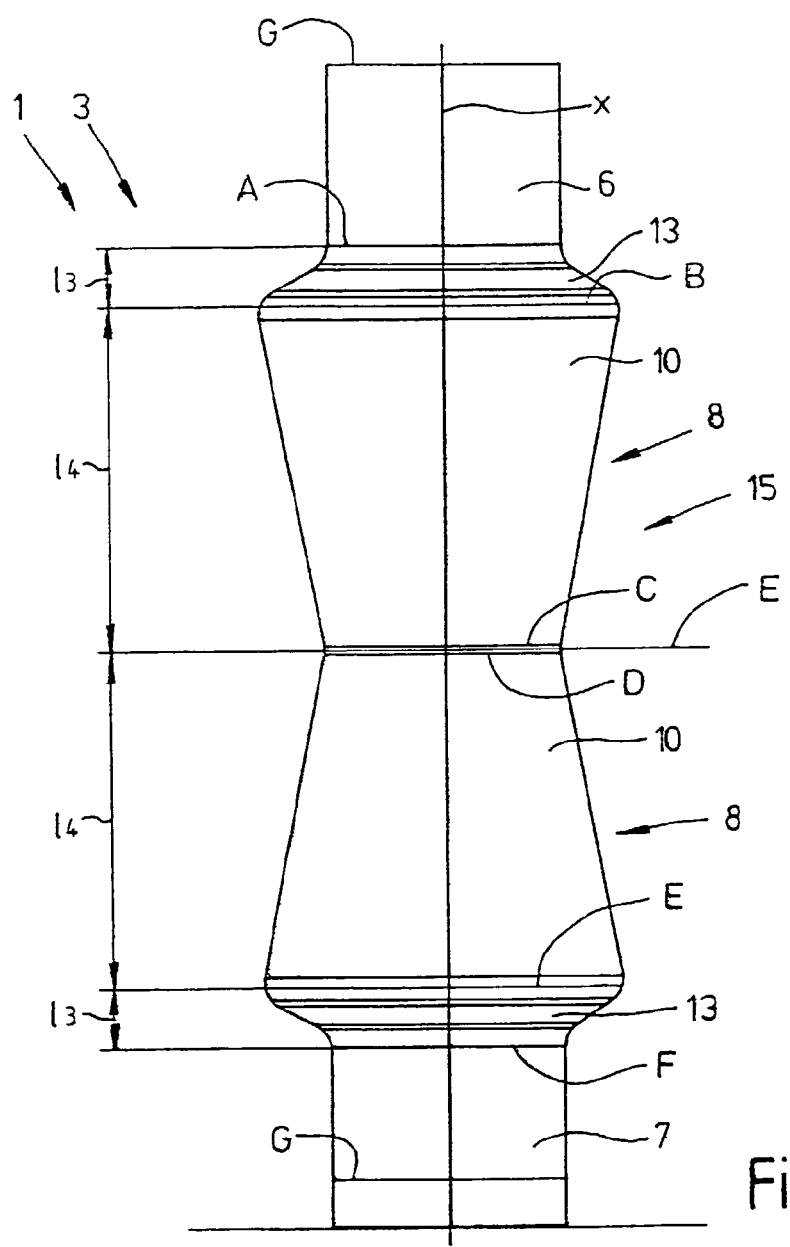
FIG. 8 shows a side view of a fourth chisel shank.

FIG. 8 shows a further chisel 1, of which only a chisel shank 3 is illustrated for the sake of simplification. The chisel shank 3 has, in a similar way to the chisel shank illustrated in FIG. 6, a double bead 15 consisting of two thickenings 8 which are arranged mirror-symmetrically to a plane E, to which a longitudinal mid-axis x of the chisel shank 3 is perpendicular. The thickenings each consist of a body of revolution 13 and of a cone frustum 10 and extend over length portions $l_3$, $l_4$, which are in the ratio of about 1:6. The upper thickening 8 first increases from a cross section A to a cross section B and then decreases again to a cross section C. The latter corresponds to a small cross section D of the lower thickening 8 which increases to a cross section E and subsequently decreases again to a cross section F. The cross sections A, C, D and F correspond to a cross section G of chisel shank portions 6, 7.

Figure 9:
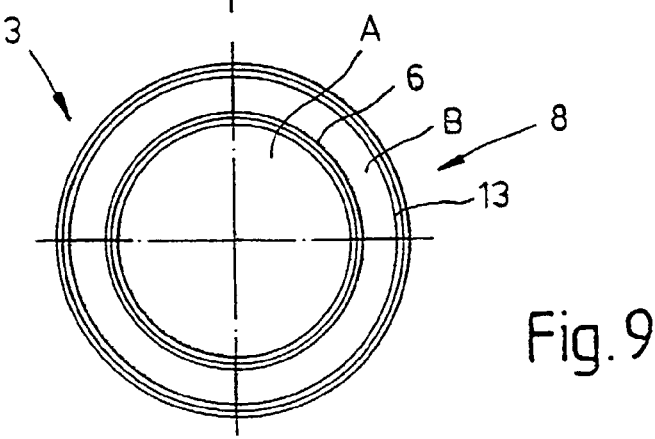
FIG. 9 shows a top view of the chisel shank illustrated in FIG. 8,
FIGS. 10a to 10f show side views and top views of three hammer drills with beads thickening in the effective direction of the hammer drills.
Figures 12A, 12C:
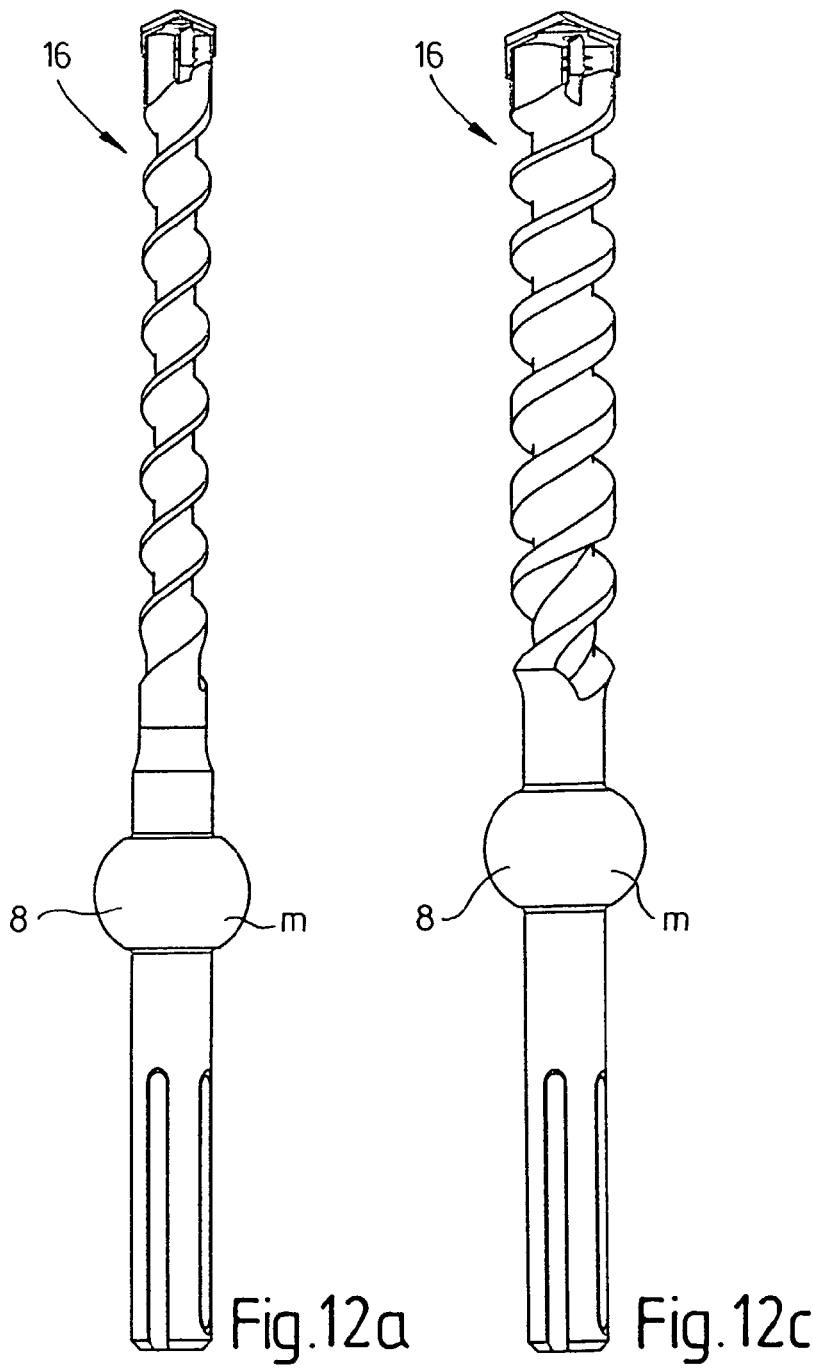
FIGS. 12a to 12d show side views and top views of two hammer drills with approximately spherical beads.
Figures 12B, 12D:
Figures 13A, 13C, 13E:
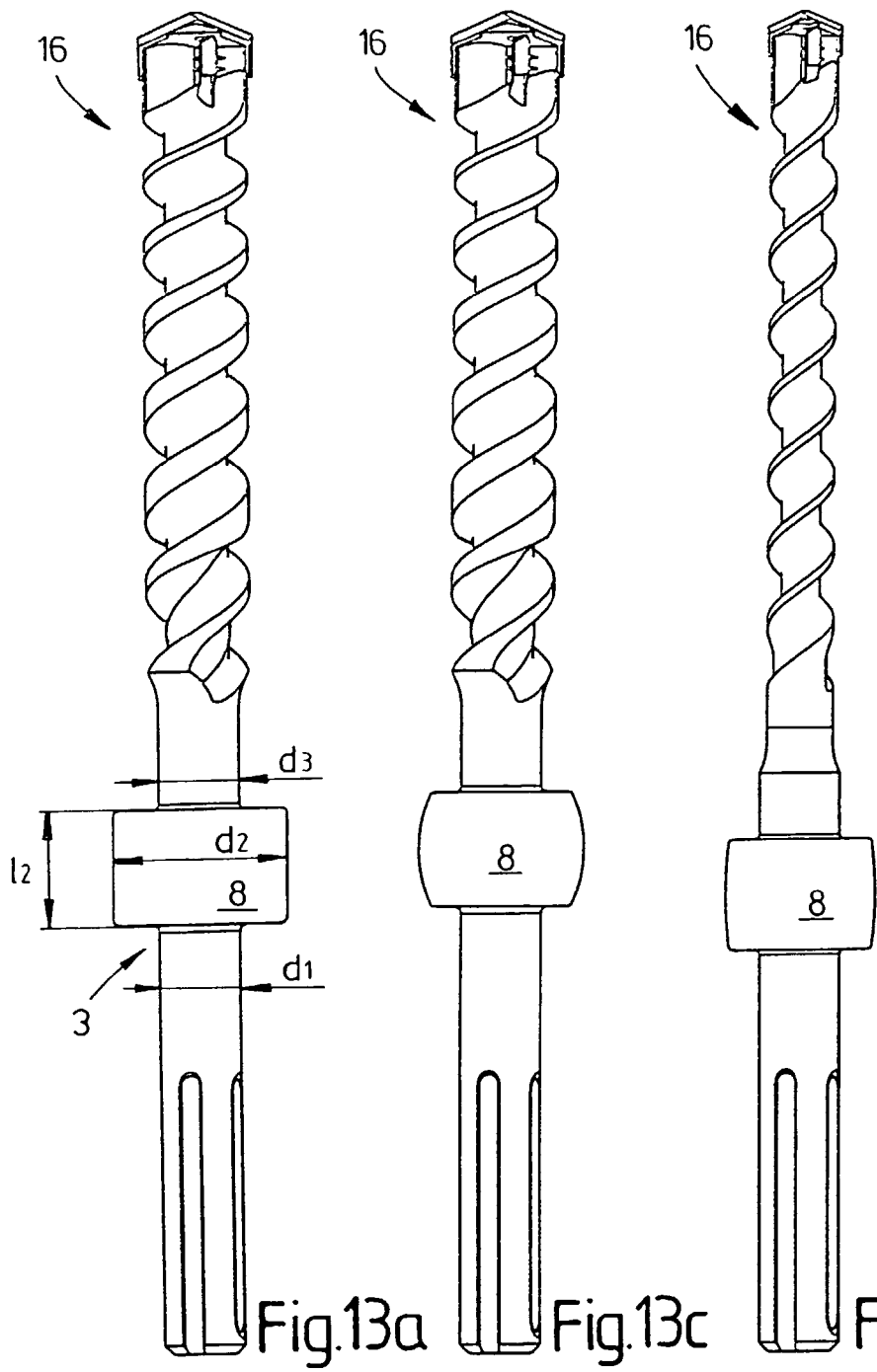
FIGS. 13a to 13f show side views and top views of three hammer drills with approximately rectangular beads.
Figure 13B:
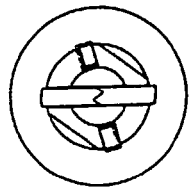
Figure 13D:
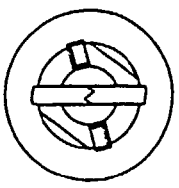
Figure 13F:
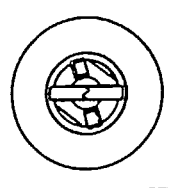

FIG. 9 shows a top view of the chisel shank 3 illustrated in FIG. 8. This shows a circular cross section A of a chisel shank portion 6 and a circular cross section B of the body of revolution 13 partially forming the upper thickening 8.

FIG. 10a shows a side view of a hammer drill 16. This has a drill shank 3 which consists of an insertion end 2, of an upper drill shank portion 6, of a thickening 8 adjoining the latter, of an lower drill shank portion 7, of a helix 17 and of a drill head 4. Starting from an initial diameter $d_0$ of the upper drill shank portion 6, the bead 8 increases from a first diameter $d_1$, corresponding to the initial diameter $d_0$, virtually abruptly and then slowly to a second, large diameter $d_2$ and thereafter narrows on a short portion to a third, smaller diameter $d_3$ which corresponds to the first diameter $d_1$. The lower drill shank portion 7 decreases in an effective direction p, via a shoulder 18, from a diameter $d_0$ or $d_3$ to a spine diameter $d_R$ of the helix 17.

FIG. 10b shows a top view of the hammer drill 16 illustrated in FIG. 10a. The rotationally symmetric design of the thickening 8 can be seen in the top view. A cutting plate 19, to which two auxiliary cutting edges 20 are assigned, can be seen in the drill head 4.

FIG. 10c illustrates a further hammer drill 16 which, in principle, has the same construction as the hammer drill illustrated in FIG. 10a. In contrast to this, the hammer drill 16 illustrated in FIG. 10c has a spine diameter $d_R$ which is larger than an initial diameter $d_0$ of the drill shank 3. A bead 8 of the hammer drill 16 is at a distance g from an insertion end 2 of a hammer drill 16. The distance g is, in practice, about 140 to 150 mm and is calculated from a length of a beater arranged in a drill hammer, multiplied by a factor of 2 to 4. For example, the beater of a drill hammer of the 5-kg class has a length of 30 to 40 mm. In the case of the drill hammer of the 7-kg class, the beater length is about 50-60 mm. A rock drill hammer of the 10-11 kg class possesses a beater with a length greater than 60 mm. Conventional hammer drills 16 have an overall length of about 520 mm, the drill head 4 and the helix 17 occupying approximately 340 mm. The shank length is then about 180 mm.

FIG. 10d shows, in a similar way to FIG. 10b, a top view of the hammer drill illustrated in FIG. 10c.

FIGS. 10e and 10f illustrate a further variant of a hammer drill 16. This has a bead 8 of trapezoidal cross section.

FIGS. 11a to 11g show two further hammer drills 16 in side view and top view. The hammer drills 16 have beads 8 which are designed and arranged as cone frustums 21 oriented in an effective direction p.

FIGS. 12a to 12d illustrate two design variants of a hammer drill 16 having beads 8 which are formed as a spherical thickening. As compared with a hammer drill without a bead, the mass of the hammer drill with the bead 8 is increased by a differential mass m. The additional mass m brought about by the bead 8 is, for example, about 80 g and amounts approximately to 0.2 to 0.7 times a mass of a beater of a drill hammer. For example, the beater mass of what is known as a 5-kg drill hammer is about 125 g, in the case of a 7-kg drill hammer the beater weighs about 205 g and, in the case of a 10- or 11-kg drill hammer, the weight of the beater is in the region of about 440 g.

FIGS. 13a to 13f illustrate three further hammer drills 16. The characteristic of these hammer drills is that the diameter of a shank 3 increases from a small diameter $d_1$ abruptly to a large diameter $d_2$, remains constant or approximately constant at the large diameter $d_2$ over a portion 12 and thereafter decreases abruptly to a third, smaller diameter $d_3$.

FIGS. 14a to 14d illustrate two further hammer drills 16. These have beads 8 which are approximately in the form of a mushroom head 22. In this case, the mushroom heads 22 of the hammer drills 16 illustrated in FIGS. 14a, 14b and 14c, 14d are oriented differently in an impact direction p.

The beads illustrated in FIGS. 1 to 9 for chisels may likewise be used in hammer drills. The beads illustrated in FIGS. 10a to 14d for hammer drills may advantageously also be used in chisels. The statements made on FIGS. 10a to 14d with regard to the position of the thickening or with regard to the mass of the thickening also apply in a similar way to chisels.

The bead can be arranged in that half of the shank which faces the insertion end.

The invention is not restricted to exemplary embodiments illustrated or described. On the contrary, it embraces developments of the invention within the scope of the patent claims. In particular, the invention also provides for arranging a plurality of thickenings spaced apart from one another in the region of a shank. Furthermore, there is also provision for causing differently designed thickenings to merge one into the other. A further design variant of the invention provides for rotating the shank about the longitudinal axis, a rotation of the thickening, in particular of a thickening which is not rotationally symmetric, also selectively being provided.

The invention claimed is:

1. A chisel, comprising:
   a shank having opposite ends;
   one end of the shank comprising an insertion portion; and
   the end of the shank opposite the insertion portion comprising a head,
   wherein the head is a working end and wherein a cross sectional area of the shank increases in the direction of the head at least once from a first small cross sectional area to a large cross sectional area and then decreases to a second small cross sectional area to form a bead,
   wherein the bead dampens vibration,
   wherein the bead is part of the shank, the bead is at a position on the shank between the insertion portion and the head, and the bead is at a distance from the insertion portion,
   wherein the insertion portion, head, bead, and shank are formed out of one piece,
   wherein the bead is rotationally symmetric about a longitudinal axis and has a circular cross section perpendicular to the longitudinal axis,
   wherein the bead is arranged in that half of the shank which faces the insertion end, and
   wherein the shank is not helical.

2. The chisel as claimed in claim 1, wherein a shape of the first small cross-sectional area corresponds to a shape of the second small cross-sectional area.

3. The chisel as claimed in claim 1, wherein the first small cross-sectional area is in a ratio of about 1:1.6 to the large cross-sectional area.

4. The chisel as claimed in claim 1, wherein the second small cross-sectional area is in a ratio of about 1:1.2 to the large cross-sectional area.

5. The chisel as claimed in claim 1, wherein the shank has at least one of a circular cross section normal to the longitudinal axis of the shank, an oval cross section normal to the longitudinal axis of the shank, or an elliptic cross section normal to the longitudinal axis of the shank.

6. The chisel as claimed in claim 1, wherein the increase or decrease in diameter or in cross-sectional area takes place at least one of continuously or in steps.

7. A power-driven hammer tool comprising a beater having a length and the chisel as claimed in claim 1, wherein the bead is at a distance from the insertion end which corresponds approximately to twice to four times the length of the beater arranged in the power-driven hammer tool.

8. A power-driven hammer tool comprising a beater having a mass and the chisel as claimed in claim 1, wherein the bead has a mass which corresponds approximately to 0.2 times to 0.7 times the mass of the beater arranged in the power-driven hammer tool.

9. The chisel as claimed in claim 1, wherein the shank, other than the insertion portion, head, and thickening, has a uniform cross section perpendicular to the longitudinal axis.

10. The chisel as claimed in claim 1, wherein the first small cross section corresponds approximately to the second small cross section.

11. The chisel as claimed in claim 1, wherein the bead is essentially trapezoid shaped in a longitudinal cross section.

* * * * *